US007755592B2

(12) United States Patent
Ham

(10) Patent No.: US 7,755,592 B2
(45) Date of Patent: *Jul. 13, 2010

(54) METHOD AND APPARATUS FOR DRIVING LIQUID CRYSTAL DISPLAY

(75) Inventor: Yong Sung Ham, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 928 days.

This patent is subject to a terminal disclaimer.

(21) Appl. No.: 11/482,915

(22) Filed: Jul. 10, 2006

(65) Prior Publication Data

US 2006/0250346 A1 Nov. 9, 2006

Related U.S. Application Data

(63) Continuation of application No. 10/291,371, filed on Nov. 12, 2002, now Pat. No. 7,106,287.

(30) Foreign Application Priority Data

Dec. 12, 2001 (KR) .............................. 2001-78449

(51) Int. Cl.
*G09G 3/36* (2006.01)
*G09G 5/00* (2006.01)
*G06F 3/038* (2006.01)
*G02F 1/133* (2006.01)
*G02F 1/13* (2006.01)

(52) U.S. Cl. ......................... 345/101; 345/204; 349/72; 349/199

(58) Field of Classification Search ................ 345/204, 345/101; 349/72, 199
See application file for complete search history.

(56) References Cited

U.S. PATENT DOCUMENTS

| | | | | |
|---|---|---|---|---|
| 5,495,265 | A | 2/1996 | Hartman et al. | |
| 5,929,833 | A | 7/1999 | Koshobu et al. | |
| 6,115,021 | A | 9/2000 | Nonomura et al. | |
| 6,256,006 | B1 | 7/2001 | Yamamoto et al. | |
| 6,304,254 | B1 | 10/2001 | Johnson et al. | |
| 6,414,664 | B1 | 7/2002 | Conover et al. | |
| 6,707,439 | B2 | 3/2004 | Ijima et al. | |
| 7,106,287 | B2 * | 9/2006 | Ham | 345/89 |

FOREIGN PATENT DOCUMENTS

JP 2001-100180 4/2001

* cited by examiner

*Primary Examiner*—Alexander S. Beck
(74) *Attorney, Agent, or Firm*—McKenna Long & Aldridge

(57) ABSTRACT

A method of driving a liquid crystal display in which frames having data values indicate the gray scale for liquid crystal in a display panel including the steps of determining a modulating data value for a first temperature interval within a temperature range, storing the modulating data as look-up table, sensing a temperature of a display panel, and modulating the input signal to the liquid crystal display based upon the sensed temperature.

3 Claims, 8 Drawing Sheets

METHOD AND APPARATUS FOR DRIVING LIQUID CRYSTAL DISPLAY

This application is a continuation of U.S. patent application Ser. No. 10/291,371, filed Nov. 12, 2002, now U.S. Pat. No. 7,106,287 which claims the benefit of Korean Application No. 2001-78449 filed on Dec. 12, 2001, which is hereby incorporated by reference for all purposes as if fully set forth herein.

BACKGROUND OF THE INVENTION

1. Field of the Invention

This invention relates to a liquid crystal display, and more particularly to a method and apparatus of driving a liquid crystal display for improving the picture quality.

2. Description of the Related Art

Generally, a liquid crystal display (LCD) controls a light transmittance of each liquid crystal cell in accordance with a video signal to thereby display a picture on a display panel. An active matrix LCD includes a switching device for each liquid crystal cell of the display panel that is suitable for displaying a dynamic image. The active matrix LCD uses thin film transistors (TFT's) as switching devices.

The LCD can have a slow response time due to inherent characteristics of a liquid crystal, such as a viscosity and elasticity, as represented in the following equation (1):

$$\tau_r \propto \gamma d^2/\Delta\epsilon|V^2_a - V^2_F| \quad (1)$$

wherein $\tau_r$ is response time of a liquid crystal; d is a cell gap of liquid crystal cells; γ is a viscosity coefficient of the liquid crystal molecules; $V_a$ is a starting voltage level of a voltage across the liquid crystal; $V_F$ is a target voltage level that is a Freederick transition voltage at which liquid crystal molecules begin to make an inclined motion; and Δε is a dielectric constant anisotropy.

A twisted nematic (TN) mode liquid crystal has a response time affected by the viscosity and elasticity of the liquid crystal, as well as other physical characteristics of the liquid crystal. Typically, a TN mode liquid crystal has response times that includes a rise time of 20 to 80 ms and a fall time of 20 to 30 ms. Since these response times of the TN mode liquid crystal are longer than the interval (i.e., 16.67 ms in the case of NTSC system) of a frame in a moving picture, a voltage charge in a liquid crystal cell for a first frame progresses into a second frame prior to arriving at a target voltage for the first frame. Thus, a blurring phenomenon occurs in which the moving portion of a picture on the display panel is blurry.

FIG. 1 is a waveform diagram showing variation in brightness levels in response to changes in voltage levels of data voltage for a cell of a related art liquid crystal display. The cell of a related art LCD will not display a desired color at a desired brightness, upon implementation of a moving picture, if the display brightness BL fails to reach a target brightness level corresponding to an input of data voltage VD. This failure is due to the slow response time of the liquid crystal in changing from one voltage level of a first data voltage to another voltage level of a second data voltage, as shown in FIG. 1. Accordingly, the display quality of the LCD is reduced since the contrast ratio for the moving portions of the picture is reduced or is not commensurate with the input of data voltage VD.

To overcome the problems associated with the slow response time of liquid crystal in an LCD, a strategy of modulating a data in accordance with a change of the data, hereinafter referred to as "high-speed driving strategy" has been suggested. A high-speed driving strategy modulates input data into modulated data. The waveform diagram shown in FIG. 2 is an example of a brightness variation in response to input of a modulated data voltage in a related art high-speed driving strategy. The related art high-speed driving strategy modulates an input data voltage VD to apply a modulated data voltage MVD to the liquid crystal cell, thereby obtaining a desired brightness MBL. This high-speed driving strategy increases the difference of $|V_a^2 - V_F^2|$ in the above equation (1) such that a desired brightness level BL for the data voltage VD can be obtained in a response time that is less than an interval of a frame. In effect, the modulating the data voltage VD accelerates the speed in which the liquid crystal responds such that the brightness level BL, which is commensurate with the voltage level of the data voltage VD, is reached prior to the next frame. Thus, an LCD using a high-speed driving strategy compensates for a slow response time of the liquid crystal by modulating inputted data values such that the blurring phenomenon is reduced and the moving portion of a picture is displayed at a desired color and at a desired brightness.

Referring to FIG. 3, a related art high-speed driving strategy compares the four most significant bits MSB of a previous frame Fn−1 with those of a current frame Fn and, if there is a change of the most significant bits, selects the corresponding modulating data Mdata from a look-up table to modulate it as shown in FIG. 3. This type of high-speed driving strategy modulates only the first four most significant bits so as to reduce the size of memory needed. A high-speed driving apparatus implemented in this manner is shown in FIG. 4.

Referring to FIG. 4, a related art high-speed driving apparatus includes a frame memory 43 connected to a most significant bit bus line 42, and a look-up table 44 commonly connected to the most significant bit bus line 42 and an output terminal of the frame memory 43. The frame memory 43 stores the most significant bits MSB during one frame interval and supplies the stored data to the look-up table 44. The most significant bits MSB can be, for example, the first four 4 bits of an 8-bit RGB source data representing the voltage level of a data voltage.

The look-up table 44 compares the four most significant bits MSB of a current frame Fn inputted from the most significant bit line 42 with those of the previous frame Fn−1 inputted from the frame memory 43 to select the corresponding modulating data Mdata in accordance with a look-up table, such as Table 1 below. The modulating data Mdata is then combined with the least significant bits LSB from a less significant bit bus line 41 for application to the LCD panel.

TABLE 1

| Fn − 1/Fn | | | | 0 | 1 | 2 | 3 | 4 | 5 |
|---|---|---|---|---|---|---|---|---|---|
| 0 | 0 | 1 | 2 | 4 | 5 | 5 | 5 | 5 | 5 |
| 1 | 0 | 1 | 2 | 3 | 4 | 5 | 5 | 5 | 5 |
| 2 | | 0 | 2 | 3 | 4 | 5 | 5 | 5 | 5 |
| 3 | | 0 | 1 | 2 | 4 | 4 | 5 | 5 | 5 |
| 4 | | 0 | 1 | 2 | 3 | 4 | 5 | 5 | 5 |
| 5 | | | 1 | 2 | 3 | 4 | 5 | 5 | 5 |
| 6 | | | 0 | 1 | 3 | 4 | 5 | 5 | 5 |
| 7 | | | 0 | 1 | 2 | 4 | 4 | 5 | 5 |
| 8 | | | | 1 | 2 | 3 | 4 | 5 | 5 |
| 9 | | | | 0 | 2 | 3 | 4 | 5 | 5 |
| 10 | | | | 0 | 1 | 3 | 4 | 5 | 5 |
| 11 | | | | | 1 | 2 | 4 | 5 | 5 |
| 12 | | | | | 0 | 2 | 3 | 5 | 5 |
| 13 | | | | | 0 | 1 | 3 | 4 | 5 |
| 14 | | | | | | 1 | 3 | 4 | 5 |
| 15 | | | | | | 1 | 3 | 4 | 5 |

In the above table, the left column is the value of the data voltage determined from the MSB of the previous frame Fn−1 while an uppermost row is the value of the data voltage determined from MSB of the current frame Fn. However, the related art LCD high-speed driving strategy is designed based on the operating temperature being at a specific reference temperature, such as at a room temperature of 20° C., to determine the look-up table. Thus, if the temperature of the liquid crystal is at different operating temperature than the reference temperature that look-up table is based upon, the modulated data voltage MVD is will not be properly set and the response time of the liquid crystal may be off. As a result, the related art LCD will now have a desired brightness or moving picture that does not blur in an environment having a different temperature than the reference temperature. For example, if a temperature of the liquid crystal is more than the reference temperature, then viscosity coefficient γ of the liquid crystal molecules and a dielectric constant anisotropy Δϵ of the liquid crystal are increased. However, if temperature of the liquid crystal is less than the reference temperature, then a viscosity coefficient γ of the liquid crystal molecules and a dielectric constant anisotropy Δϵ of the liquid crystal are decreased. Because response time of the liquid crystal is inversely proportional to temperature, the related art LCD has a higher brightness than a desired brightness when operating at temperatures above the reference temperature and will have a lower brightness than a desired brightness as well as blur when operating at a temperature below the reference temperature.

SUMMARY OF THE INVENTION

Accordingly, the present invention is directed to a method and apparatus of driving a liquid crystal display that substantially obviates one or more of the problems due to limitations and disadvantages of the related art.

An object of the present invention is to provide a method and apparatus of driving a liquid crystal display for improving the quality of a moving picture.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a method of driving a liquid crystal display in which frames having data values indicate the gray scale for liquid crystal in a display panel, includes the steps of determining a modulating data value for a first temperature interval within a temperature range, storing the modulating data as look-up table, sensing a temperature of a display panel and modulating the input signal to the liquid crystal display based upon the sensed temperature.

In another embodiment, a method of driving a liquid crystal display in which frames having data values indicate the gray scale for liquid crystal in a display panel, includes the steps of storing a reference look-up table determined on a basis of a reference temperature interval along with ratios of liquid crystal response time for temperature intervals within a temperature range to a response time of the liquid crystal within the reference temperature interval, sensing a temperature of the display panel, determining reference modulating data from the reference look-up table based on source data from a current frame and a previous frame and adjusting said reference modulating data in accordance with a stored ratio corresponding to the temperature interval that said sensed temperature is within.

In another embodiment, a driving apparatus for a liquid crystal display for displaying frames having data includes a look-up table storing modulating data values for each temperature interval within a temperature range such that a plurality of look-up tables store modulating data values for the temperature range, a temperature sensor for sensing a temperature of a display panel and a selector for selecting one of a modulating data outputted from the plurality of look-up tables in accordance with said sensed temperature.

In another embodiment, a driving apparatus for a liquid crystal display for displaying frames having data includes a reference look-up table for storing a reference modulating data determined on a basis of a reference temperature interval and for storing ratios of liquid crystal response time for temperature intervals within the temperature range to a response time of the liquid crystal within a reference temperature interval, a temperature sensor for sensing a temperature of a display panel and an arithmetic unit for adjusting said reference modulating data in accordance with a stored ratio corresponding to the temperature interval that said sensed temperature is within.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 5:
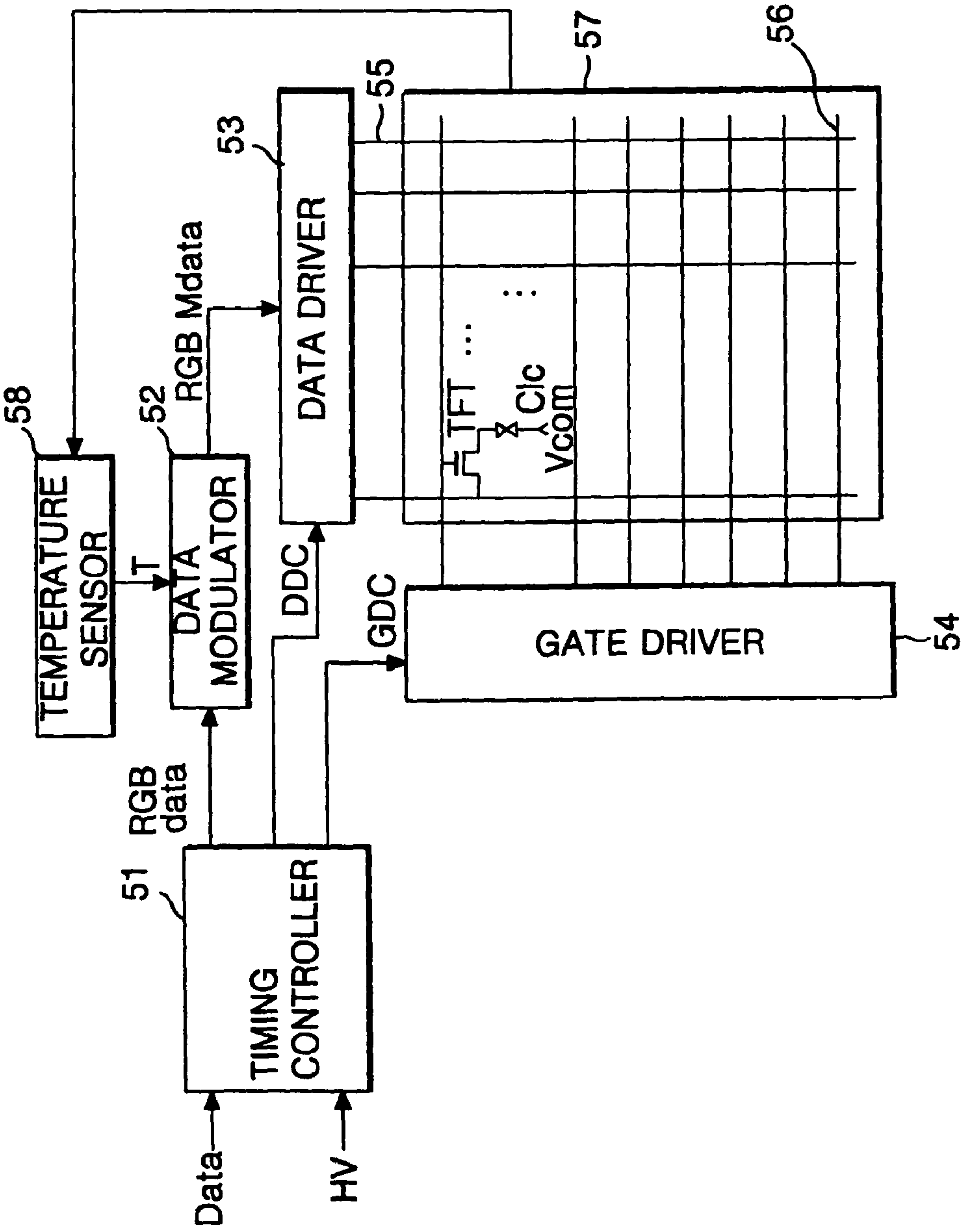
FIG. 5 is a block diagram showing a configuration of a driving apparatus for a liquid crystal display according to embodiments of the present invention.

Reference will now be made in detail to the preferred embodiments of the present invention, examples of which are illustrated in the accompanying drawings. FIG. 5 is a block diagram showing a configuration of a driving apparatus for a liquid crystal display according to an embodiment of the present invention. The LCD driving apparatus in FIG. 5 includes a liquid crystal display panel 57 having data lines 55 and gate lines 56, which cross each other. Adjacent to each intersection where the data lines 55 and gate lines 56 cross, a TFT is provided to drive a liquid crystal cell Clc. As also shown in FIG. 5, the LCD driving apparatus in FIG. 5 includes a data driver 53 for supplying a data to the data lines 55 of the liquid crystal display panel 57, a gate driver 54 for applying scanning pulses to the gate lines 56 of the liquid crystal display panel 57, a timing controller 51 supplied with a digital video data and synchronizing signals H and V, a temperature sensor 58 for sensing a temperature of the liquid crystal display panel 57, and a data modulator 52 for selecting or deriving a modulating data MData that drives a liquid crystal cell such that a predetermined response time is obtained even if the temperature of the liquid crystal display panel 57 changes.

The data lines 55 and the gate lines 56 are provided on a lower glass substrate and a liquid crystal is positioned between the lower glass substrate and an upper glass substrate to for a liquid crystal panel display 57. TFTs are provided for each liquid crystal cell CLc adjacent to intersections of the data lines 55 and the gate lines 56. The TFTs respond to scanning pulses on the data lines 55 in driving the liquid crystal cells Clc, which are respectively connected to a TFT. To this end, a gate electrode of each TFTs is connected to one of the gate lines 56 while a source electrode thereof is connected to one of the data lines 55. The drain electrode of each respective TFT is connected to the pixel electrode of the liquid crystal cell Clc that connects to the respective TFT.

Digital video data is supplied from a digital video card (not shown). The timing controller 51 re-arranges the digital video data into RGB data, which is supplied to the data modulator 52. Further, the timing controller 51 receives horizontal/vertical synchronizing signals H and V to supply a data driving control DDC signal to the data driver 53 and to supply a gate driving control GDC signal to the gate driver 54. The DDC signal includes a source shift clock SSC, a source start pulse SSP, a polarity control signal POL and source output enable signal SOE. The GDC signal includes a gate start pulse GSP, a gate shift clock GSC and a gate output enable signal GOE.

In response to the gate driving control signal GDC from the timing controller 51, the gate driver 54 generates a scanning pulse. More particularly, the gate driver 54 can include a shift register and a level shifter for driving the liquid crystal cell Clc. The TFT is turned on in response to the scanning pulse. Upon turn-on of the TFT, video data on the data line 55 is supplied to the pixel electrode of the liquid crystal cell Clc.

The data driver 53 supplies data from the data modulator 52 to the data lines 55 in response to the data driving control signal DDC from the timing controller 51. The data driver 53 samples the variable modulating data RGB Mdata from the data modulator 52 and latches data for the data lines such that an appropriate sample is latched for each data line. The data latched by the data driver 53 for each of the data lines 55 is converted into a gamma voltages that is supplied applied to the data lines 55 during a scanning interval.

The data modulator 52 stores data for maintaining the response time of the LCD. The data modulator 52 includes at least one look-up table for a temperature or temperature interval. The data modulator 52 can included a plurality of look-up tables or a reference look-up table used in conjunction with an arithmetic unit. A temperature sensor 58 that is connected the data modulator 52 temperatures senses a temperature of the liquid crystal display panel 57 and applies the sensed temperature information T to a control terminal of the data modulator 52.

Figure 6:
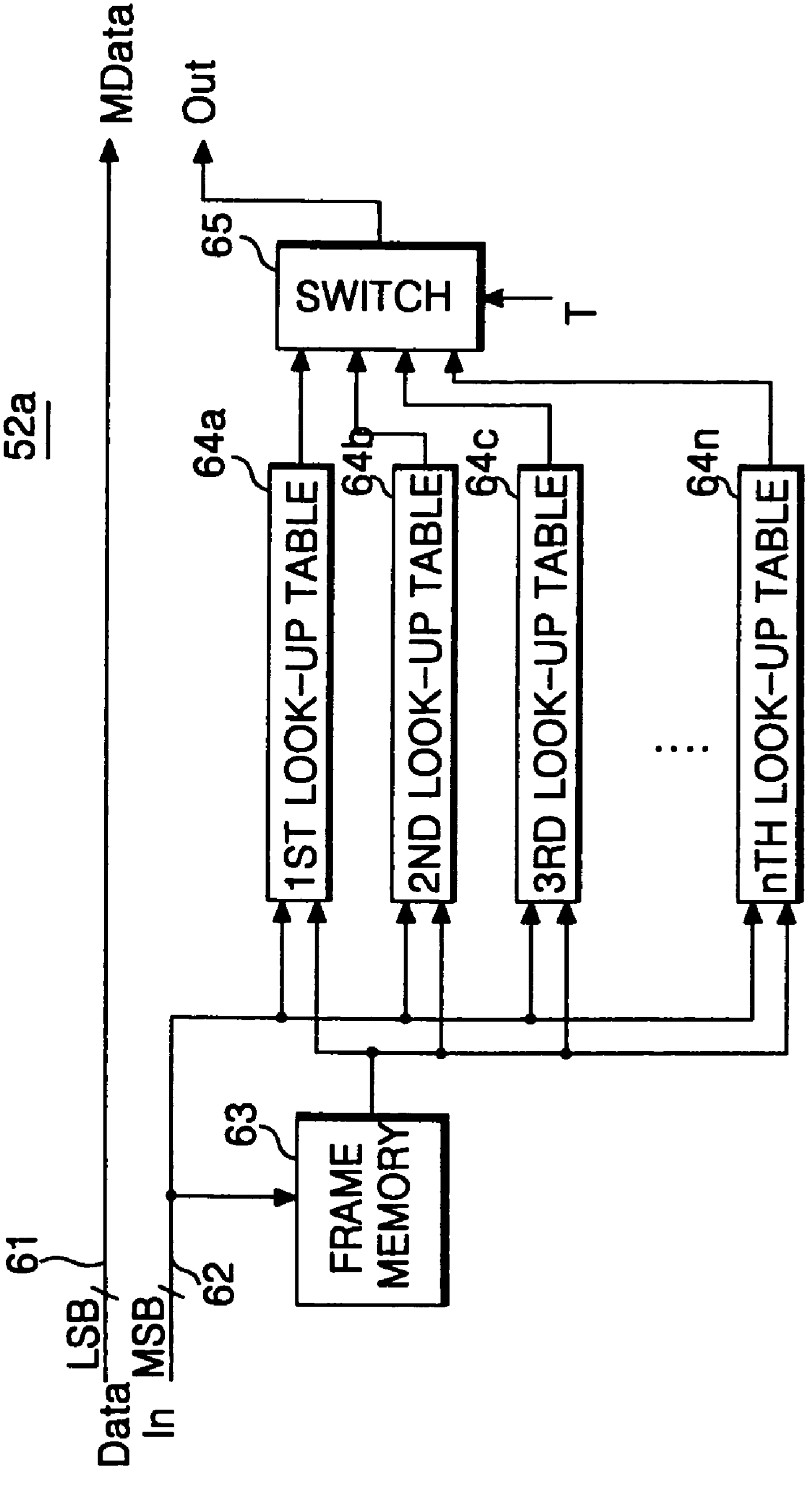
FIG. 6 is a block diagram of a first embodiment of the data modulator shown in FIG. 5.

FIG. 6 is a block diagram of the data modulator **52*a* using a plurality of look-up tables according to a first embodiment of the present invention. As shown in FIG. 6, the data modulator 52*a* includes a frame memory 63 for storing most significant bits of source data, look-up tables 64*a* to 64*n*, which store modulating data for each temperature interval within a temperature range and receives most significant bits of source data, a switch 65 for selecting modulating data from one of the look-up tables 64*a* to 64*n* in accordance with a sensed temperature from the liquid crystal display panel 57**.

The frame memory 63 is connected to a most significant bit bus line 62 of the timing controller 51 and stores most significant bits MSB inputted from the timing controller 51 during a frame interval. Further, the frame memory 63 supplies most significant bits MSB of a past frame while a current frame is supplied to the look-up tables **64*a* to 64*n* from the most significant bit bus line 62. In each look-up table, modulating data is stored for each temperature interval within a temperature range. For example, if a temperature range of −5° C. to 65° C. is divided into intervals of 10° C., then the modulating data of each look-up table 64*a* to 64*n*** has a liquid crystal response time that is substantially similar to a predetermined time even though an operating temperature of the liquid crystal display panel changes. Table 2 below presents the physical property variations and response times calculated by the equation (1) at the temperatures of 0° C., 10° C., 20° C., 30° C., 40° C., 50° C. and 60° C. that are respectively for the 10° C. temperature intervals within the temperature range of −5° C. to 65° C. for a liquid crystal developed by Merck Company having a response time of 16.67 ms at 20° C. with a drive frequency of 60 Hz.

TABLE 2

| Temp. (° C.) | Dielectric Constant Anisotropy ($\Delta\epsilon$) | Viscosity Coefficient ($\gamma$) | $\gamma/\Delta\epsilon$ | Response Time (RT) | Comparison of Response Time (with interval of 20° C.) |
|---|---|---|---|---|---|
| 0 | 13.3 | 260.0 | 19.5 | 39.4 | 2.36 |
| 10 | 12.2 | 149.0 | 12.2 | 24.6 | 1.47 |
| 20 | 11.1 | 92.0 | 8.3 | 16.7 | 1.00 |
| 30 | 10.0 | 660.0 | 6.0 | 12.1 | 0.72 |
| 40 | 9.0 | 41.0 | 4.6 | 9.2 | 0.55 |
| 50 | 7.9 | 29.0 | 3.7 | 7.4 | 0.44 |
| 60 | 6.8 | 21.0 | 3.1 | 6.2 | 0.37 |

Figure 1:
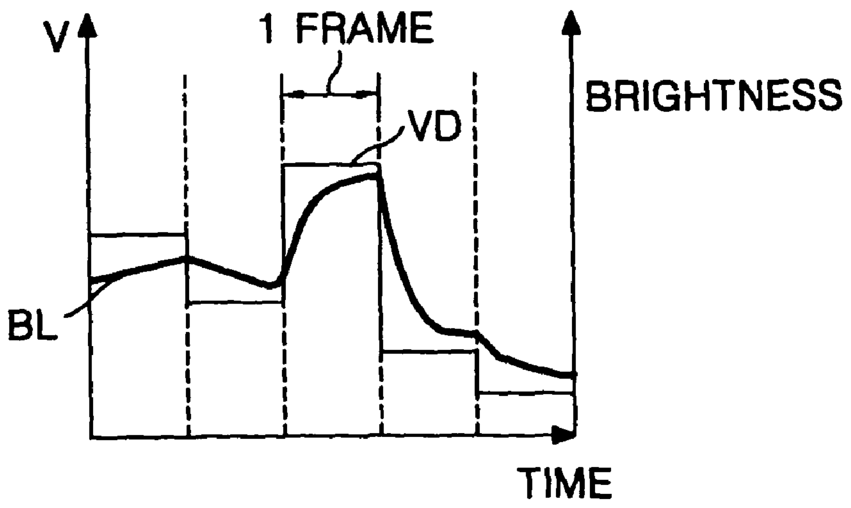
FIG. 1 RELATED ART
FIG. 1 is a waveform diagram showing variation in brightness levels in response to changes in voltage levels of data voltage for a cell of a related art liquid crystal display.
Figure 2:
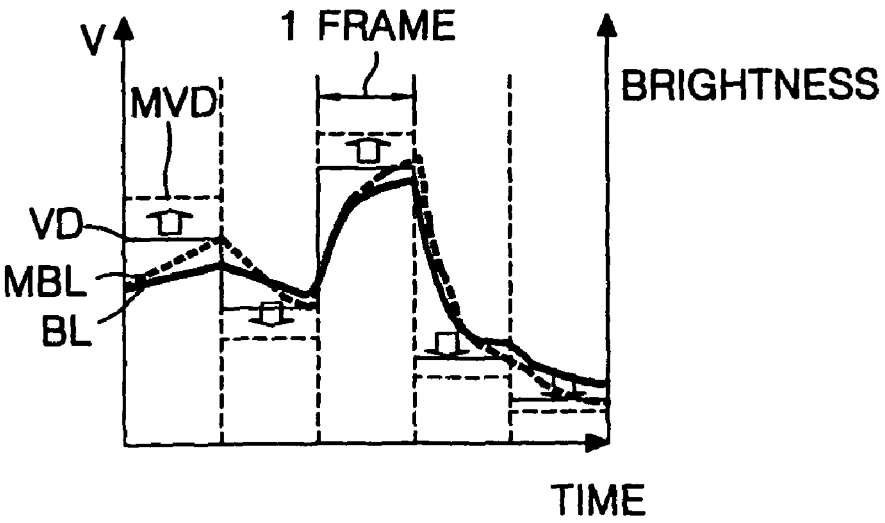
FIG. 2 RELATED ART
FIG. 2 is a waveform diagram showing an example of brightness variation for a cell of a related art liquid crystal display according to a data modulation of a related art high-speed driving strategy.
Figure 3:
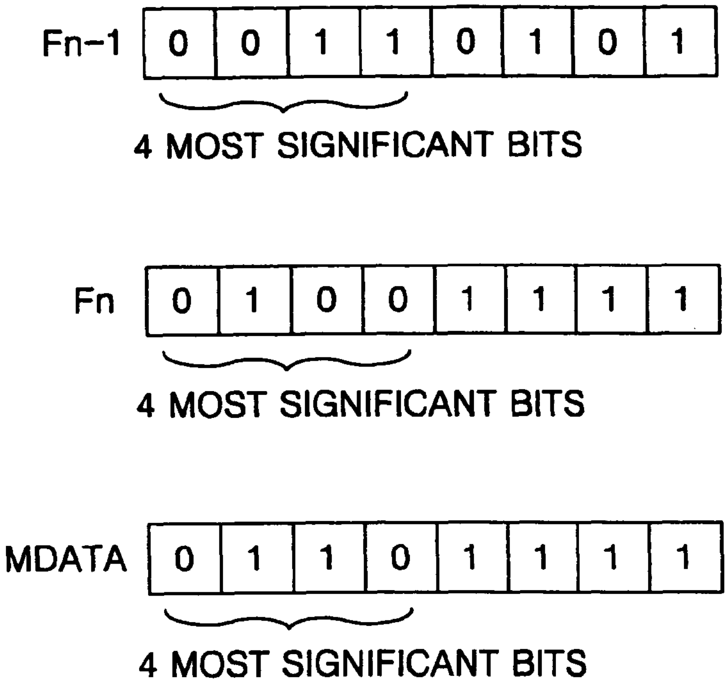
FIG.3 RELATED ART
FIG. 3 depicts a related art high-speed driving strategy applied to a 8-bit data.
Figure 4:
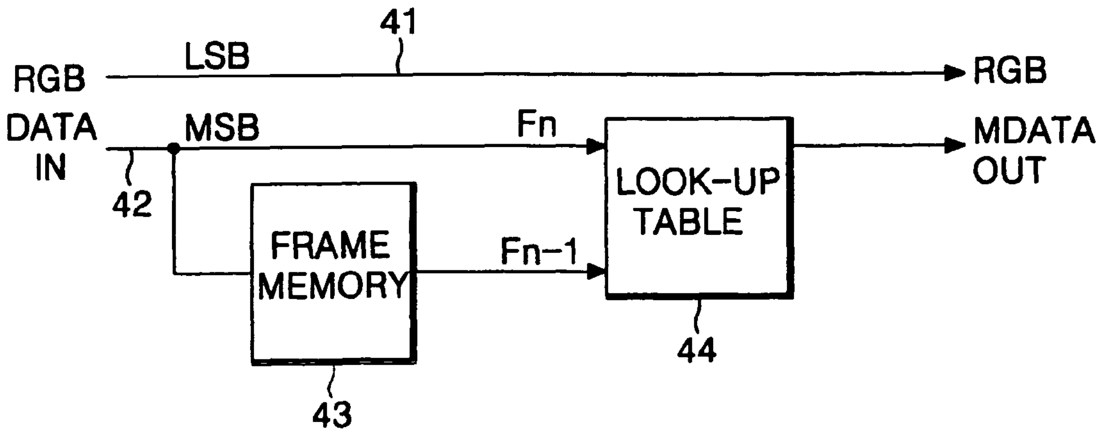
FIG.4 RELATED ART
FIG. 4 is a block diagram showing a configuration of a related art high-speed driving apparatus.

As can be seen from Table 2, the response time RT of the liquid crystal varies inversely to temperature. Thus, a reference temperature interval containing a reference temperature can be designated and the rest of the temperature intervals can be compared to the reference interval. As shown in FIG. 2 for example, the "Comparison of Response Time" in Table 2 compares the liquid crystal response time RT of temperate intervals of 10° C. within the temperature range of −5° C. to 65° C. to the temperature interval of 15° C. to 25° C., with a median temperature value of 20° C. that has a response time of 16.67 ms at a drive frequency of 60 Hz.

Table 2 shows that the liquid crystal has a slow response time RT of 39.4 ms within the first 10° C. temperature interval containing 0° C. as a median value. Table 2 also shows that the liquid crystal has a fast time of 6.2 ms within the last 10° C. temperature interval containing 60° C. as a median value. If a desired response time is 16.67 ms, then the response time of the first temperature interval is 22.73 ms, which is too slow, and the response time of the last temperature interval is 10.47 ms, which is too fast. To adjust for these differences in response times due to temperature, the look-up tables 64*a* to 64*n* have different modulating data for each temperature interval such that the liquid crystal response time RT for temperatures within each temperature interval is substantially set to about the same response time. For example, the modulating data in look-up table for each temperature interval can be determined such that the response time for each temperature interval is about 16.67 ms.

The modulating data in the look-up tables 64*a* to 64*n* determines a modulated data voltage MVD based upon temperature of the liquid crystal display panel 57 and by comparing the data voltages between the previous frame Fn−1 and the current frame Fn to satisfy the following relational equations:

$$VDn<VDn-1 \rightarrow MVDn<VDn \quad \text{(i)}$$

$$VDn=VDn-1 \rightarrow MVDn=VDn \quad \text{(ii)}$$

$$VDn>VDn-1 \rightarrow MVDn>VDn \quad \text{(iii)}$$

In the above relational equations, VDn−1 represents a data voltage of the previous frame; VDn represents a data voltage of the current frame; and MVDn represents a data voltage of modulated data RGB MData.

Figure 7:
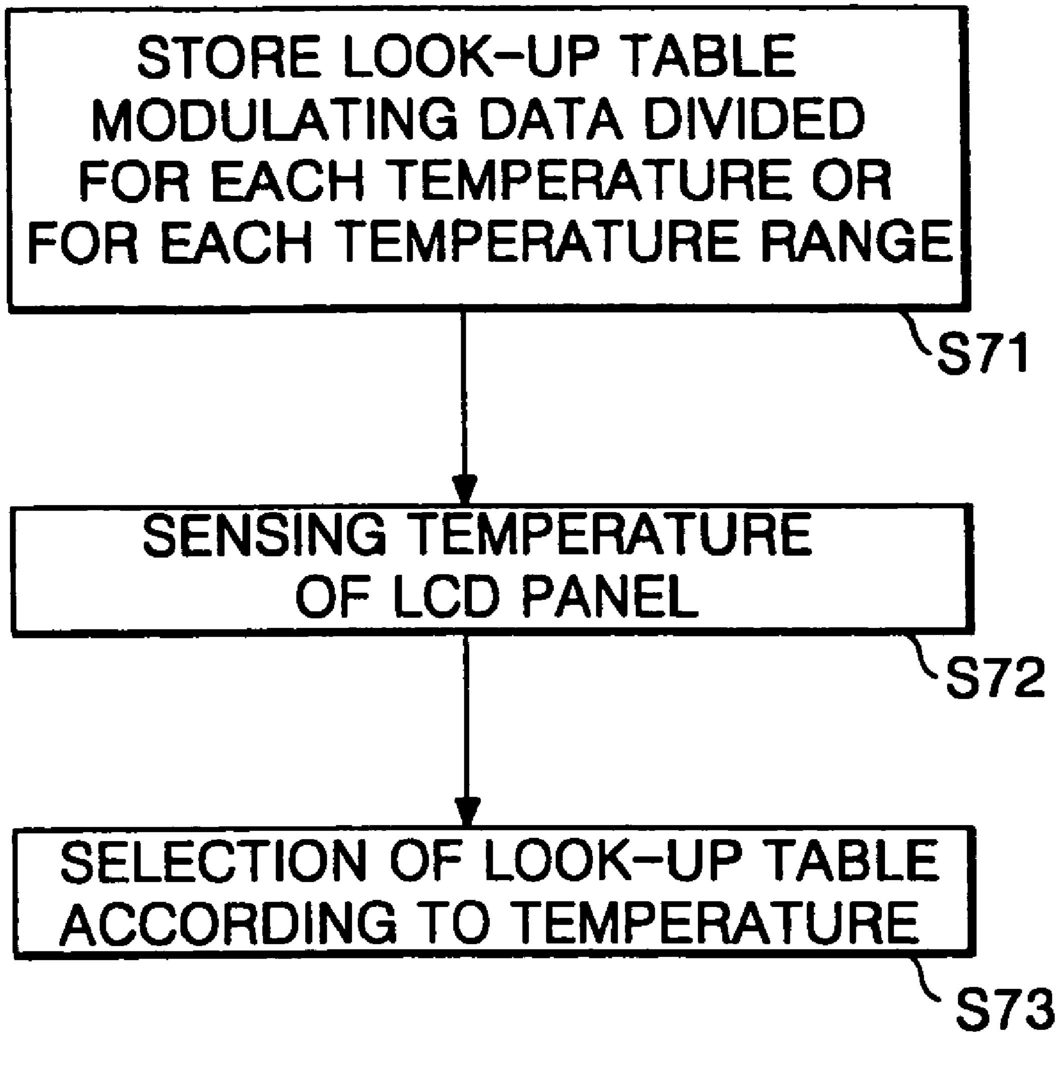
FIG. 7 is a flow chart representing a first data modulating method in accordance with embodiments of the present invention.

Such a data modulating procedure is summarized in the flow chart of FIG. 7. Referring to FIG. 7, at step S71, modulating data to each a desired response time between voltages of previous and current frames are established for a temperature interval within a temperature range and stored as a look-up table. Thus, a look-up table is stored for each temperature interval within a temperature range such that the response time of an LCD is substantially the same throughout the temperature range. As referred to in step S72, a temperature T of a liquid crystal display panel is sensed by a temperature sensor. Then, modulating data is selected from the corresponding look-up table for the a temperature interval in which sensed temperature falls within, as referred to in step S73.

Figure 8:
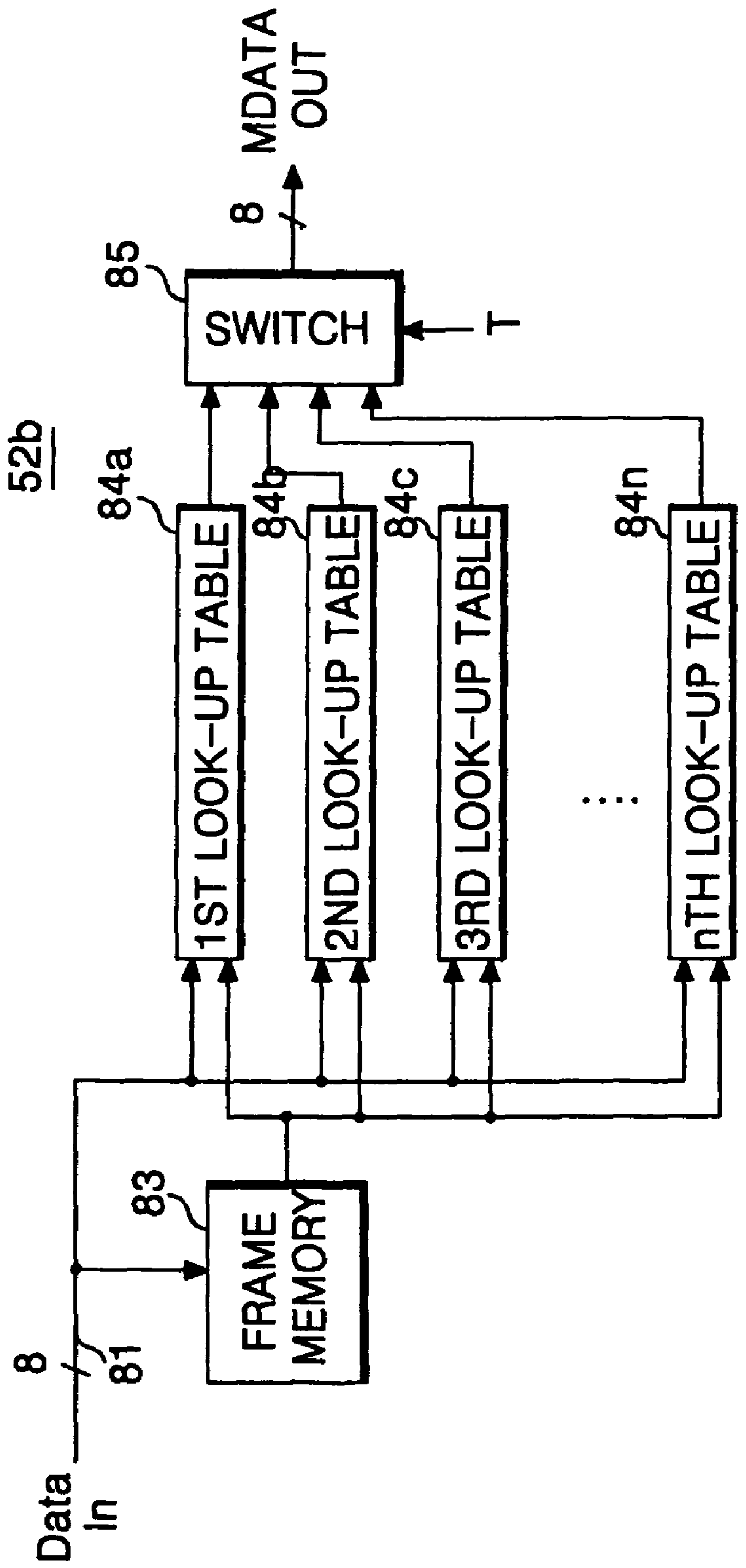
FIG. 8 is a block diagram of a second embodiment of the data modulator shown in FIG. 5.

In an alternative to the embodiment shown in FIG. 6, a data modulator 52*b* can modulate only the most significant bits MSB of source data, such as, the four-bit unit as shown in the second embodiment of FIG. 8. The data modulator 52*b* according to the second embodiment of the present invention includes a frame memory 83 for receiving a 8-bit source data, n look-up tables 84*a* to 84*n* in which modulating data for each temperature interval within a temperature range are stored, a switch 85 for selecting any one of the modulating data outputted from the n look-up tables 84*a* to 84*n* in accordance with a sensed temperature from the liquid crystal display panel 57.

The frame memory 83 is connected to a most significant bit bus line 81 of the timing controller 51 to store a 8-bit source data inputted from the timing controller 51 during one frame interval. Further, the frame memory 83 applies a 8-bit source data stored every frame to the n look-up tables 84*a* to 84*n*. Each of the n look-up tables 84*a* to 84*n* includes modulating data for each temperature interval within a temperature range. The modulating data of the look-up tables is used to maintain a consistent response time even though operating temperatures change or physical properties of the LCD change due to temperature.

Figure 9:
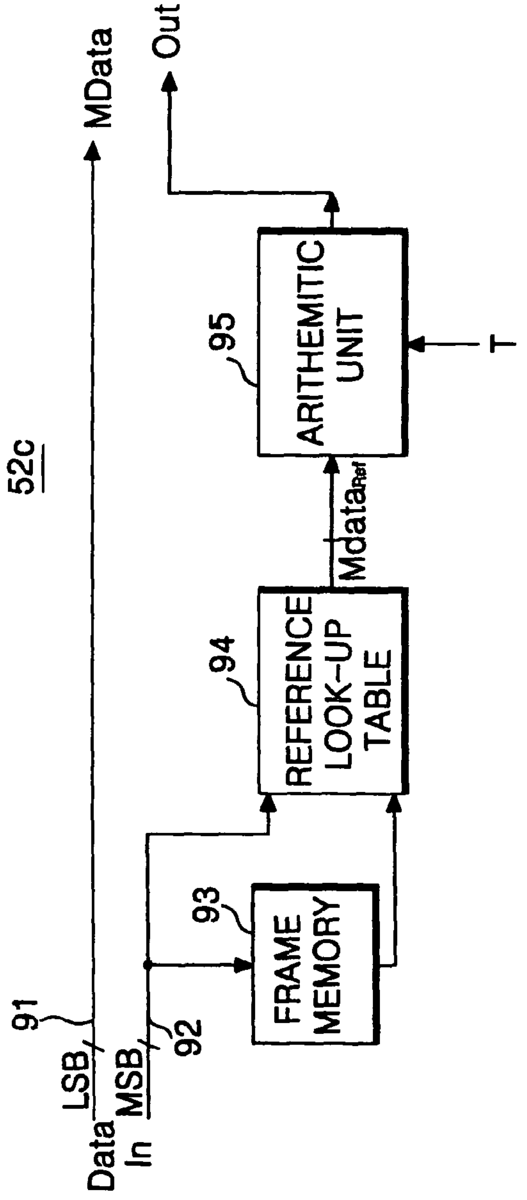
FIG. 9 is a block diagram of a third embodiment of the data modulator shown in FIG. 5.

FIG. 9 is a block diagram showing a configuration of a data modulator 52*c* using an arithmetic unit in accordance with a third embodiment of the present invention. The data modulator 52*c* includes a frame memory 93 for receiving most significant bits, a reference look-up table 94 in which reference modulating data established on a basis of a reference temperature has been stored along with ratios for temperature intervals within a temperature range, an arithmetic unit 95 for performing an arithmetic operation with reference modulating data inputted from the reference look-up table 94 and a ratio in accordance with a sensed temperature from the liquid crystal display panel 57 to derive modulating data corresponding to the sensed temperature.

The frame memory 93 is connected to a most significant bit bus line 92 of the timing controller 51 to store most significant bits MSB inputted from the timing controller 51 during one frame interval. Further, the frame memory 93 supplies most significant bits MSB stored from a previous frame to the reference look-up table 94 while the most significant bit bus line 92 provide MSB of a current frame to the look-up table 94. The reference look-up table 94 stores reference modulating data for displaying a brightness of a desired gray level within one frame interval with a predetermined liquid crystal response time of, for example, 16.67 ms at a reference temperature of, for example, 20° C. In addition, the reference look-up table 94 stores ratios of a liquid crystal response time for each temperature interval of, for example, 10° C. within a temperature range of, for example −5° C. to 65° C. to the response time of reference temperature interval of, for example 15° C. to 25° C. Both the interval and range can have any desired value. For example, the interval can be 1° C. and the range can be from 0° C. to 80° C.

The arithmetic unit 95 performs a mathematical operation on the reference modulating data using a ratio of a liquid crystal response time RT of the temperature interval that the sensed temperature from the liquid crystal display panel is within to the liquid crystal response time $RT_{ref}$ of the reference temperature interval such that the modulated data Mdata can be derived. Examples of such ratios are shown as the "Comparison of Response Time" in Table 2. Deriving the modulated data MData within the arithmetic unit allows the liquid crystal display panel 57 to display an image at a brightness of a desired gray level with a liquid crystal response time substantially equal to the liquid crystal response time within the reference temperature interval as well as at temperatures not with the reference temperature interval. Hereinafter, assuming that a reference temperature interval should be about 20° C. and assigned the value 1, an operation procedure of the arithmetic unit 95 will be described in detail.

If a currently sensed temperature of the liquid crystal display panel 57 is higher than the reference temperature interval, the liquid crystal response time is shorter. Thus, when a current frame data voltage is larger than the previous frame data voltage at a temperature higher than the reference temperature interval, the data voltage must be adjusted to be lower than a voltage setting of the reference modulating data set for a liquid crystal response time at the reference temperature so as to compensate for the shorter liquid crystal response time. To this end, the arithmetic unit 95 multiplies a reference modulating data established at a reference temperature by a response time ratio $RT/RT_{ref}$ or makes an operation of exponent multiplication with response time ratio $RT/Rt_{ref}$, as given in the equations (2) or (3), as follows, in which the $RT/RT_{ref}$ ratio is corresponds to the temperature interval in which the temperature was sensed.

$$Mdata=Mdata_{ref}\times RT/RT_{ref} \quad (2)$$

$$Mdata=Mdata_{ref}^{RT/Rt}{}_{ref} \quad (3)$$

For example, if a temperature of the liquid crystal display panel is 30° C. and the data voltages change from 2 into 4, then the RT/RTref ratio is 0.72, as shown in Table 2, and a reference modulating data $Mdata_{ref}$ '5' is selected by the reference look-up table, such as Table 1. In this case, the modulating data Mdata outputted from the arithmetic unit 95 is 5×0.72=2.60 when the operation is made in accordance with equation (2), which is lower than the $Mdata_{ref}$'5'.

When a data voltage of a current frame is smaller than the data voltage of previous frame at a temperature higher than the reference temperature interval, the data voltage must be adjusted to be higher than a voltage setting of the reference modulating data set to a liquid crystal response time at the reference temperature so as to compensate for the faster liquid crystal speed due to the temperature difference. To this end, an arithmetic unit divides a reference modulating data established at a reference temperature by a response time ratio $RT/RT_{ref}$ or makes an operation of exponent multiplication with an inverted response time ratio $RT_{ref}/Rt$, as given in the equations (4) or (5), as follows, in which the $RT/RT_{ref}$ ratio is corresponds to the temperature interval in which the temperature was sensed.

$$Mdata=Mdata_{ref}/(RT/RT_{ref})=Mdata_{ref}\times(RT_{ref}/RT) \quad (4)$$

$$Mdata=Mdata_{ref}^{RT}{}_{ref}{}^{/Rt} \quad (5)$$

For example, if a temperature of the liquid crystal display panel 57 is 30° C. and data is changed from 7 to 4, then a response time ratio RT/RTref is 12.1/16.7=0.72, as shown in Table 2, and a reference modulating data $Mdata_{ref}$ of '2' is selected by the reference look-up table, as shown in Table 2. In this case, the modulating data Mdata outputted from the arithmetic unit 95 is increased to 2÷0.72≈2.78 when a mathematical operation is made in a manner according to the equation (4) at a temperature above the reference temperature interval to compensate for the increased response speed.

If a currently sensed temperature of the liquid crystal display panel 57 is lower than the reference temperature interval, then the liquid crystal response time becomes longer. For example, if the data voltage of current frame is larger than the data voltage of a previous frame at a temperature lower than the reference voltage interval, the data voltage must be adjusted to be higher than a voltage setting of the reference modulating data set to a liquid crystal response time at the reference temperature so as to compensate for the slower liquid crystal speed due to the temperature difference. To this end, the arithmetic unit multiplies a reference modulating data established at a reference temperature by a response time ratio $RT/RT_{ref}$ or makes an operation of exponent multiplication with respect to them as given in equation (2) or (3) when a temperature is lower than the reference temperature interval and a gray level is changed to have a higher value.

For example, if a temperature of the liquid crystal display panel 57 is 10° C. and a data is changed from 2 into 4, then a response time ratio $RT/RT_{ref}$ is 24.6/16.7=1.47, as shown in Table 2 and a reference modulating data $Mdata_{ref}$ of '5' is selected by the reference look-up table, such as Table 1. In this case, the modulating data Mdata outputted from the arithmetic unit is increased to 5×1.47=7.35 when an operation is made in a manner according to the equation (2) at a temperature lower than the reference temperature interval to compensate for the slower liquid crystal speed.

When a data voltage of a current frame data is smaller than the data voltage of previous frame data at a temperature lower than the reference voltage interval, the data voltage must be adjusted to be lower than a voltage setting of the reference modulating data set to a liquid crystal response time at the reference temperature so as to compensate for the slower liquid crystal speed due to the temperature difference. To this end, an arithmetic unit divides a reference modulating data established at a reference temperature by a response time ratio $RT/RT_{ref}$ or makes an operation of exponent multiplication with an inverted response time ratio $RT/Rtr_{ef}$, as given in the equations (4) or (5), as follows, in which the $RT/RT_{ref}$ ratio is corresponds to the temperature interval in which the temperature was sensed.

For example, if a temperature of the liquid crystal display panel is 10° C. and data is changed from 7 into 4, then the response time ratio $RT/RT_{ref}$ is 24.6/16.7=1.47, as shown in Table 2, and a reference modulating data $Mdata_{ref}$ of '2' is selected by the reference look-up table, such as Table 1. In this case, the modulating data Mdata outputted from the arithmetic unit is decreased to 2÷1.47=1.36 when an operation is made in a manner according to the equation (4) at a temperature above the reference temperature interval to compensate for the increased response speed.

In the above equations, $Mdata_{ref}$ represents a reference modulating data, which is stored in a reference look-up table; and RT/RTref represents a ratio for the response time of a temperature interval to the reference temperature interval. As a result, the arithmetic unit adjusts a reference modulating data $Mdata_{ref}$ using the equation (2) or (3) when source data at the current frame Fn becomes larger than source data at the previous frame Fn−1 like the above relational equation (i), whereas it adjusts a reference modulating data $Mdata_{ref}$ using the equation (4) or (5) when source data at the current frame Fn becomes smaller than source data at the previous frame Fn−1 like the above relational equation (iii).

Figure 10:
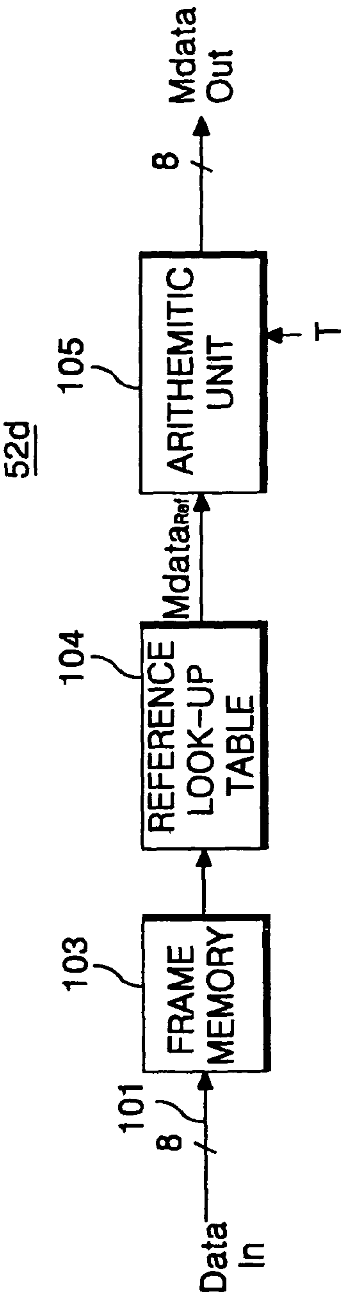
FIG. 10 is a block diagram of a fourth embodiment of the data modulator shown in FIG. 5.

Referring to FIG. 10, the data modulator **52*d* according to the fourth embodiment of the present invention includes a frame memory 103 for receiving a full-bit data source, a reference look-up table 104 in which a reference modulating data set to an optimal response time at a reference temperature has been stored along with ratios for temperature intervals within a temperature range, an arithmetic unit 105 for performing an arithmetic operation with reference modulating data inputted from the reference look-up table 94 and a ratio in accordance with a sensed temperature from the liquid crystal display panel 57** to derive modulating data corresponding to the sensed temperature.

The frame memory 103 is connected to an output bus line 101 of the timing controller 51 to stores a full-bit source data inputted from the timing controller 51 during one frame interval. Further, the frame memory 103 supplies a stored full-bit source data of a previous frame to the reference look-up table 104. The reference look-up table 104 store a reference modulating data set for an optimal response time at a reference temperature, and selects a reference modulating data $Mdata_{ref}$ as a result of a comparison between the previous frame Fn−1 and the current frame Fn to apply it to the arithmetic unit 105.

The arithmetic unit 105 performs an operation on the reference modulating data using the above-mentioned response time ratio $RT/RT_{ref}$ to thereby derive a modulated data MData. The derived modulated data MData allows the liquid crystal display panel to display an image into a brightness of a desired gray level with a liquid crystal response time equal to the liquid crystal response time within a reference temperature interval as well as at a temperatures within a temperature range outside of the reference temperature interval.

Figure 11:
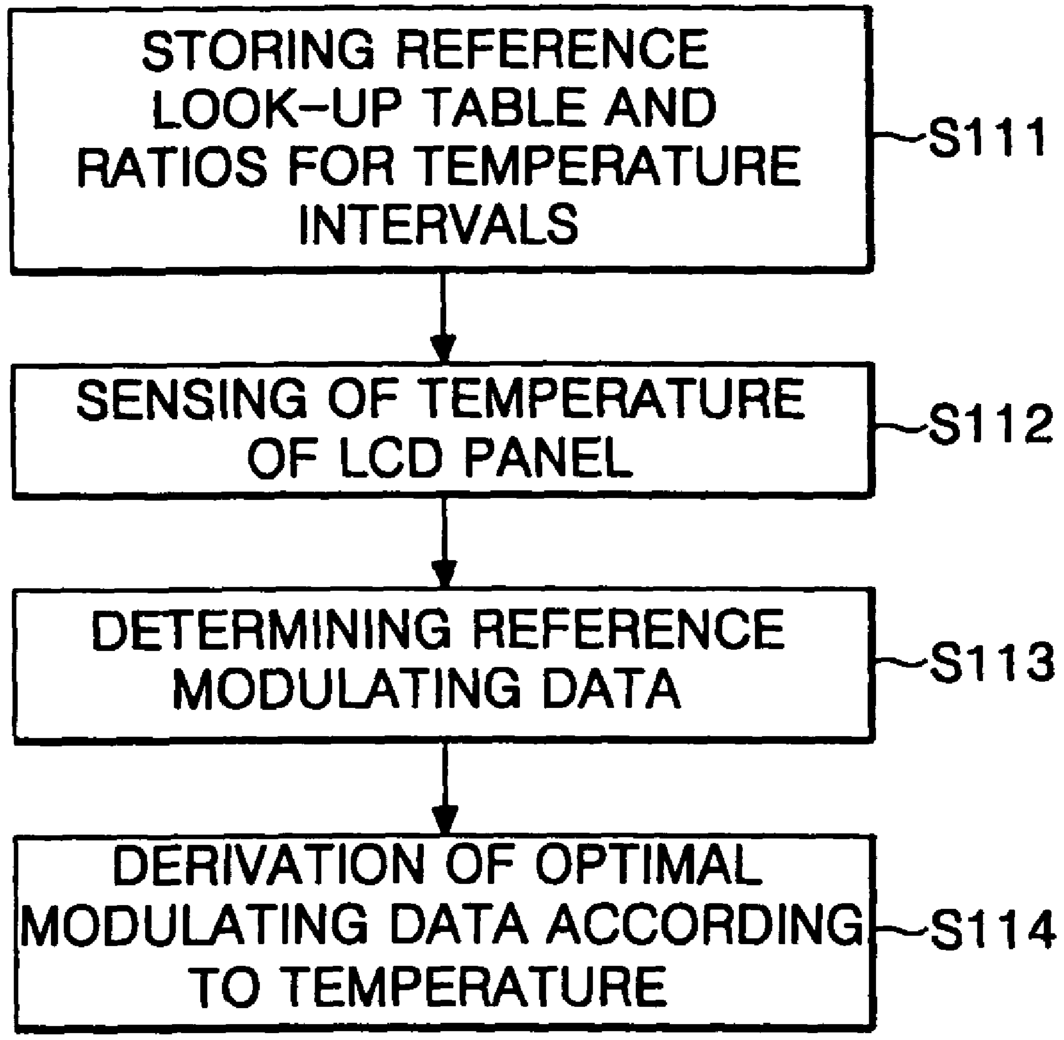
FIG. 11 is a flow chart representing a second data modulating method in accordance with embodiments of the present invention.

A data modulation process using an operation procedure is summarized in flow chart of FIG. 11. Referring to FIG. 11, at step S111, a reference look-up table that is determined based on a reference temperature interval is stored along with ratios of liquid crystal response time for temperature intervals within a temperature range to a response time of the liquid crystal within the reference temperature interval. A temperature T of the liquid crystal display panel is sensed by a temperature sensor, as referred to in step S112. Then reference modulating data is determined from the reference look-up table based on source data from a current frame and a previous frame, as referred to in step S113. The modulating data Mdata is derived base upon a response time ratio corresponding to the temperature interval that the sensed temperature T is within.

As described above, according to the present invention, the input voltage to an LCD can be modulated based on the temperature of the liquid crystal panel by determining optimal modulating data according to a sensed temperature of the liquid crystal display panel. Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A driving apparatus for a liquid crystal display for displaying frames having data, comprising:

a plurality of look-up tables respectively storing modulating data set for a plurality of temperature intervals within a temperature range, wherein each look-up table stores the corresponding modulating data set to compensate for a variation in a liquid crystal response time at each temperature interval, wherein the corresponding modulating data set is determined based on a ratio of the corresponding response time of liquid crystal at a median value of the corresponding temperature interval to a response time of liquid crystal at a median value of another temperature interval within the temperature range, and a comparing result between first and second frame data, and wherein the each look-up table compares a first data of the first frame and a second data of the second frame and select one of the corresponding modulating data set corresponding to the first and second data;

a temperature sensor for sensing a temperature of a display panel; and a selector for selecting one of a plurality of modulating data outputted from the plurality of look-up tables in accordance with said sensed temperature.

2. The driving apparatus according to claim 1, further comprising:

a frame memory for storing the first data from the first frame and inputting the first data to the look-up tables while a second set of data is inputted into the look-up tables.

3. The driving apparatus according to claim 1, further comprising:

a liquid crystal display panel having a data line supplied with data and a gate line supplied with a scanning signal;

a data driver for applying a data inputted from said selector to the data line of the liquid crystal display panel;

a gate driver for applying said scanning signal to the gate line of the liquid crystal display panel; and a timing controller for supplying source data to the look-up table and for controlling the data driver and the date driver.

* * * * *